Nov. 22, 1960     A. T. MUNNS     2,961,056
SIDE PARKING DEVICE FOR MOTOR VEHICLES
Filed Feb. 18, 1959     4 Sheets-Sheet 4

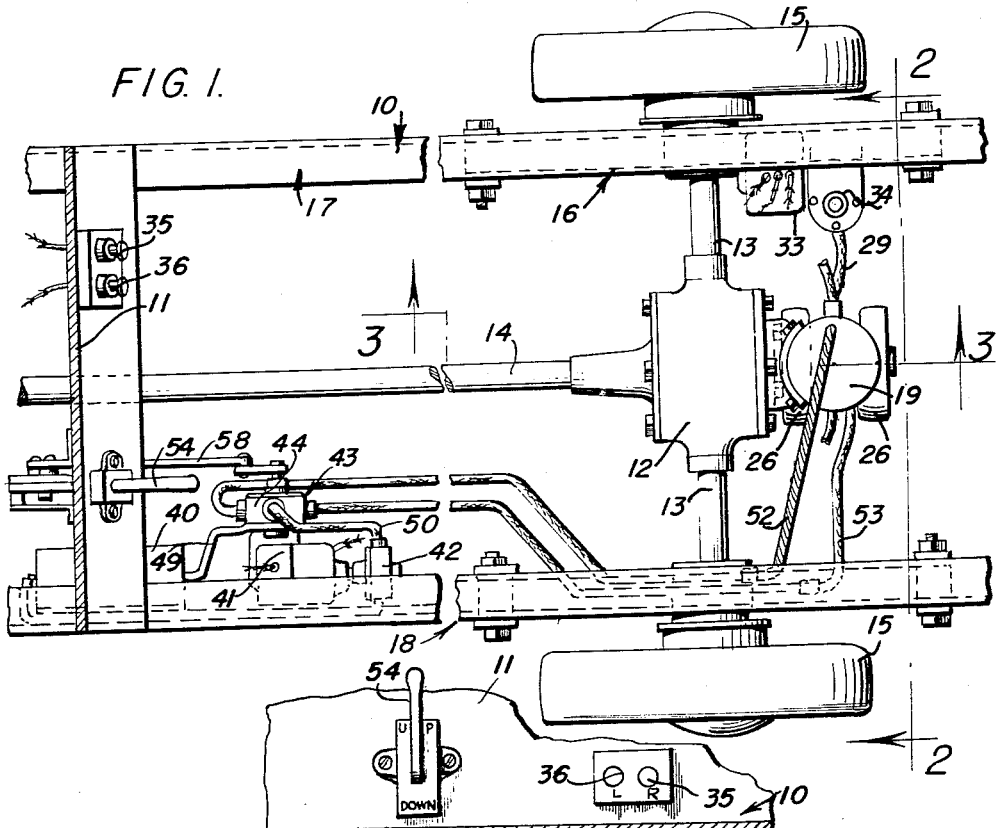

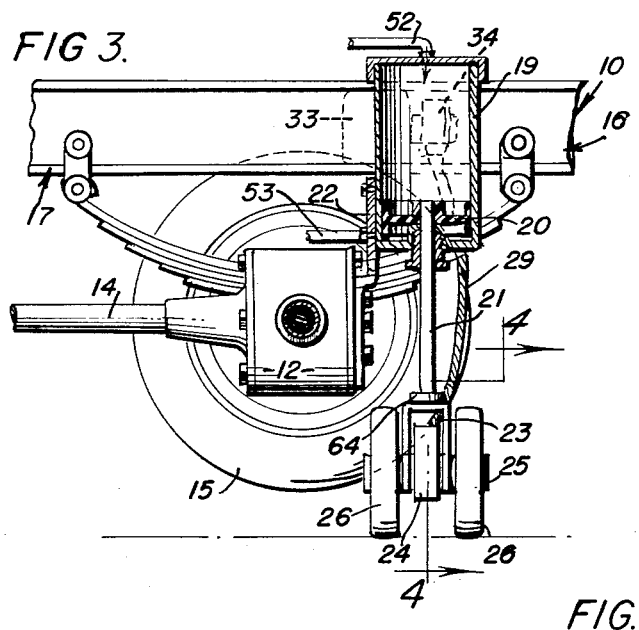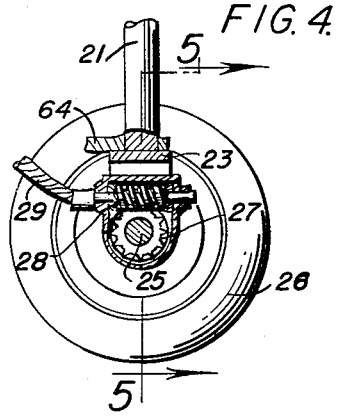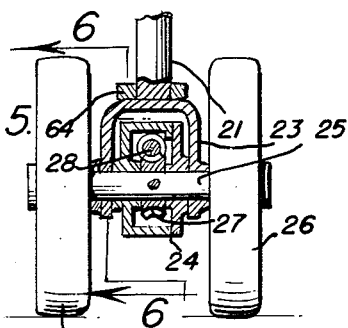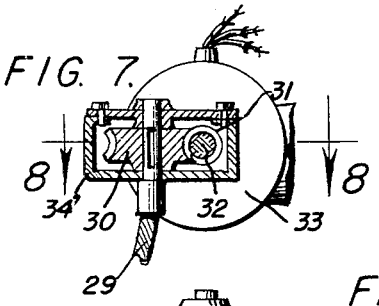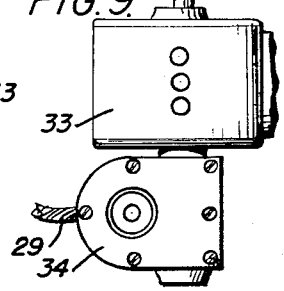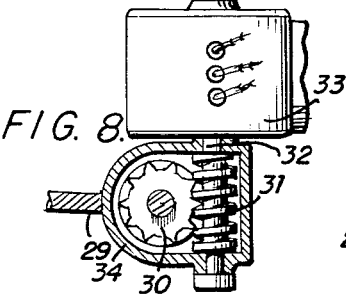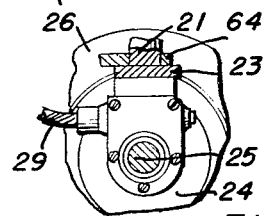
INVENTOR
ARTHUR THOMAS MUNNS
ATTORNEYS

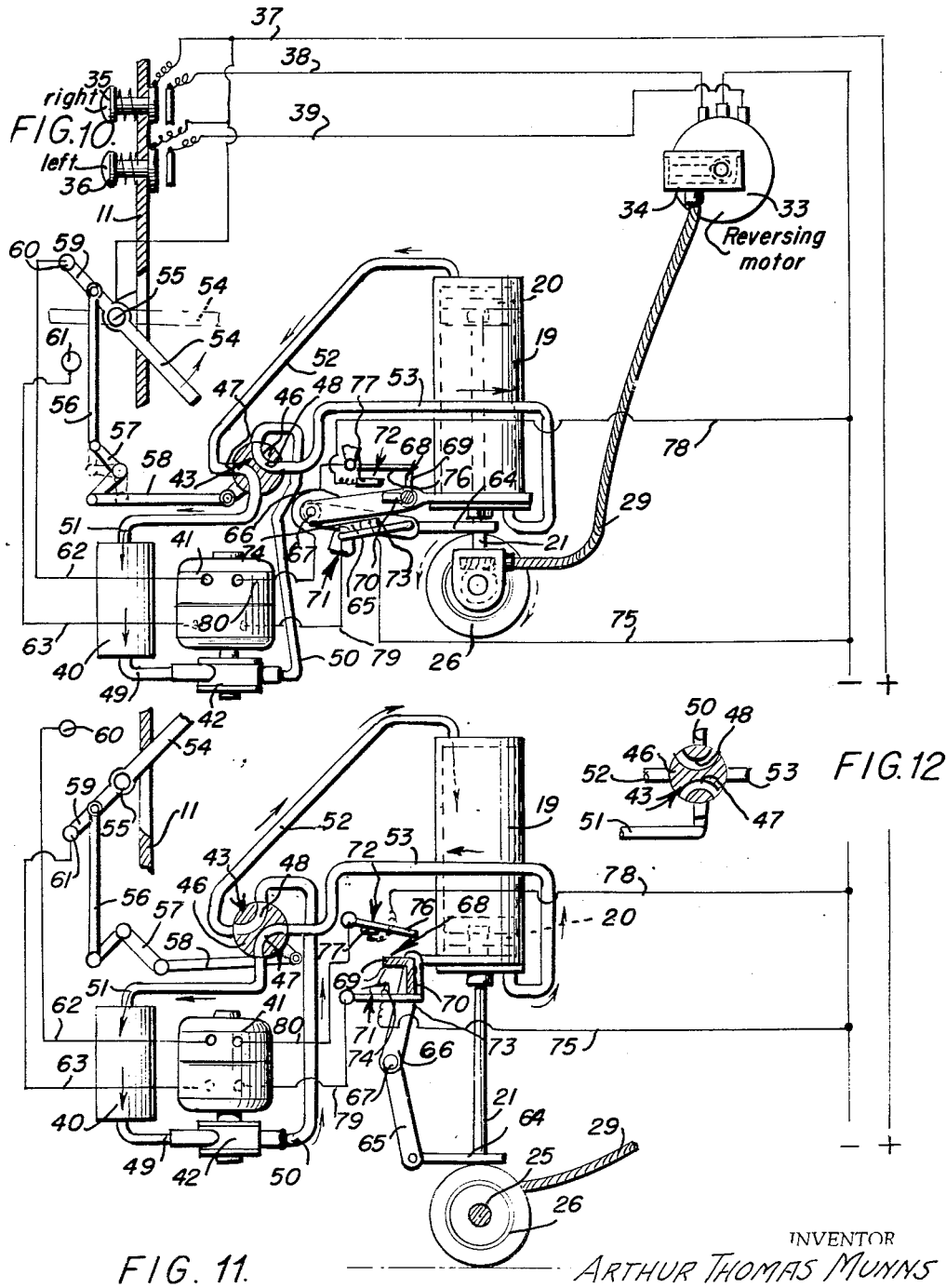

INVENTOR.
Arthur T. Munns
BY
Victor J. Evans & Co.
Attorneys

United States Patent Office 2,961,056
Patented Nov. 22, 1960

2,961,056

SIDE PARKING DEVICE FOR MOTOR VEHICLES

Arthur Thomas Munns, 307 W. Olive St., San Bernardino, Calif.

Filed Feb. 18, 1959, Ser. No. 794,131

1 Claim. (Cl. 180—1)

This invention relates to a vehicle, and more particularly to a device for facilitating the parking of a vehicle such as an automobile, truck or the like.

The object of the invention is to provide a device which will facilitate the side parking of a vehicle as for example when a vehicle is to be parked in a small space.

Another object of the invention is to provide a side parking device for motor vehicles wherein there is provided a pair of wheel members which are mounted for movement into and out of a raised or lowered position, and wherein when the wheel members are in lowered position in engagement with the road surface or ground, the regular wheels of the vehicle will be moved to a raised position so that the vehicle can be conveniently moved laterally or sideways so as to permit the vehicle to be conveniently maneuvered or moved into a small parking space or other area.

A further object of the invention is to provide a side parking device for motor vehicles which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary top plan view showing the side parking device for motor vehicles, and with parts broken away and in section;

Figure 2 is a sectional view taken on the line 2—2 of Figure 1;

Figure 3 is a sectional view taken on the line 3—3 of Figure 1;

Figure 4 is a sectional view taken on the line 4—4 of Figure 3;

Figure 5 is a sectional view taken on the line 5—5 of Figure 4;

Figure 6 is a sectional view taken on the line 6—6 of Figure 5;

Figure 7 is a fragmentary sectional view illustrating the reversing motor;

Figure 8 is a sectional view taken on the line 8—8 of Figure 7;

Figure 9 is an elevational view of the assembly of Figures 7 and 8;

Figure 10 is a schematic view illustrating certain details of the present invention, and with the piston in raised position and the wheel members in raised position;

Figure 11 is a view similar to Figure 10, but showing the parts in a different position as for example when the wheel members are in lowered position; and Figure 12 is a fragmentary sectional view illustrating the control valve.

Figure 13:
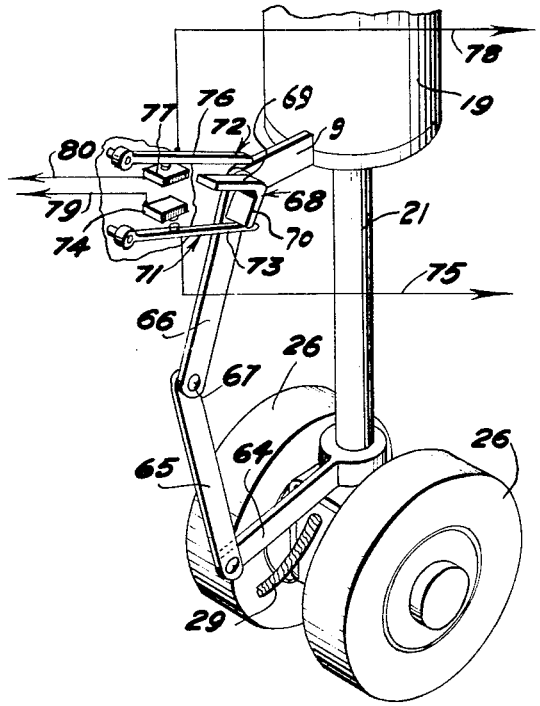
Fig. 13 is a perspective view of the members that provide the automatic breaking or interrupting of the electrical circuit to the motor operating the device and, as shown, the device is in full raised position.

Referring in detail to the drawings, the numeral 10 indicates a portion of a conventional vehicle such as an automobile, truck or the like, and the vehicle 10 includes the usual dashboard or instrument panel 11 as well as a rear axle housing 12 which has the rear axle 13 connected thereto in the usual manner. A drive shaft 14 is connected to the housing 12 as for example as shown in Figure 1. Ground engaging wheels 15 are connected to the rear axle 13 as for example as shown in Figures 1 and 2. The vehicle 10 includes the usual frame which is indicated generally by the numeral 16, and the frame 16 embodies a pair of spaced parallel horizontally disposed channel members or beams 17 and 18. The numeral 22 indicates a support member which is mounted contiguous to the rear of the housing 12, and a stationary cylinder 19 is secured to the support member 22. The numeral 20 indicates a piston which is movably mounted in the cylinder 19, and a rod 21 depends from the piston 20 and is connected thereto.

Connected to the lower end of the rod 21 is a bracket 23, and mounted within the bracket 23 is a hollow casing 24 which has a shaft 25 extending therethrough, Figure 5. A pair of spaced parallel wheel members 26 are connected to the shaft 25, and as shown in the drawings, the wheel members 24 are arranged at right angles with respect to the ground engaging wheels 15. For selectively driving or rotating the wheel members 26 in either a clockwise or counterclockwise direction, a worm gear 27 is mounted on the axle 25, and the numeral 28 indicates a worm which meshes with the gear 27. A flexible drive shaft 29 is provided for rotating the worm 28, and the drive shaft 29 is driven by a reversing motor 33, the reversing motor 33 serving to rotate a shaft 32 which has a worm 31 thereon, Figure 7, and the worm 31 meshes with a gear 30 that is on the end of the drive shaft 29. The members 31 and 30 may be arranged in a suitable casing 34, as shown in the drawings. The reversing motor 33 is adapted to be supported by the beams 17, and may be fastened thereto in any suitable manner.

A means is provided for controlling operation of the reversing motor 33, and this means comprises a pair of push buttons 35 and 36 which are adapted to be arranged in a convenient location such as on the dashboard 11, Figure 10. The push buttons 35 and 36 are connected in an electrical circuit by means of wires such as the wires 37, 38 and 39.

There is further provided a means for causing actuation or up and down movement of the piston 20 in the cylinder 19, and this means comprises a hydraulic reservoir tank 40 which may be supported by the beams 17, and the tank 40 may contain a suitable quantity of hydraulic fluid under pressure. The numeral 41 indicates an electric motor which serves to operate a pump 42, and the numeral 43 indicates a control valve. As shown in the drawings, the valve 43 includes a stationary casing 44 which has a movable core 46 therein, and the core 46 is provided with spaced apart passageways 47 and 48, Figures 10 and 11. A conduit 49 connects the tank 40 to the pump 42, and a conduit 50 extends between the pump 42 and the valve 43. A line or conduit 51 extends between the tank 40 and the valve 43, and other spaced apart conduits 52 and 53 serve to connect the valve 43 to the upper and lower ends of the stationary cylinder 19, the conduits 52 and 53 being high pressure flexible conduits.

There is further provided a manually operable means for moving or actuating the valve 43, and this means comprises a hand lever 54 which is pivotally supported on a convenient location such as the dashboard 11 as at 55. A linkage serves to operatably connect the lever 54 to the movable core 46 of the valve 43, and this linkage comprises pivotally connected members 56, 57, and 58. Thus, by manually moving the lever 54 to a raised or lowered or intermediate position, the core 46 can be rotated or shifted so that the passageways 47 and 48 will be moved into and out of registry with the conduits such as the conduits 52, 53, 50 and 51 whereby the position of the wheel members 26 can be readily controlled or regulated.

The lever 54 carries a contact 59, and the contact 59 is mounted for movement into and out of engagement with spaced apart terminals 60 and 61. Wires 62 and 63 connect the terminals 60 and 61 to the pump motor 41. It is to be noted that due to the provision of the contact 59 which is mounted for movement into and out of engagement with the terminals 60 or 61, as well as the linkage 56, 57 and 58 which connects the lever 54 to the valve core 56, it will be seen that when the lever 54 is manually moved, the motor 41 will be controlled, and at the same time, the linkage 56, 57 and 58 will properly set or move the valve core 46 so as to insure that the hydraulic fluid flows in the proper direction. When the lever 54 is in the broken line position of Figure 10 which is an intermediate position, the valve core 46 is in the locked position as shown in Figure 12 so that the piston 20 as well as the wheel members 26 will be locked or maintained immobile in their adjusted position.

Figure 14:
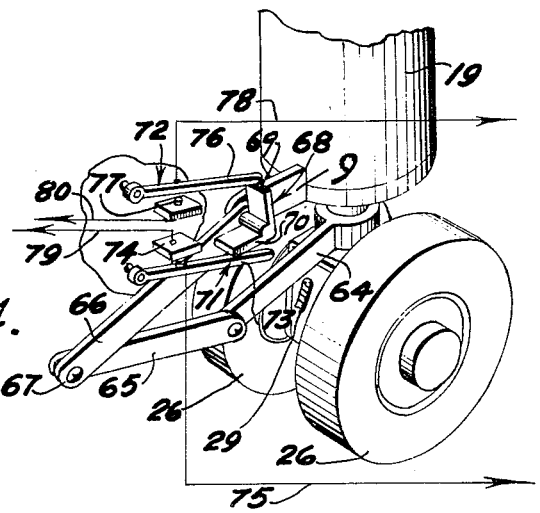
Fig. 14 is a view similar to Fig. 13 with the device in full lowered position.

As shown in the drawings, a means is provided for automatically breaking or interrupting the electrical circuit to the motor 41, when the piston 20 reaches the upper or lower limit of its travel. This means comprises an arm 64 which is fastened to the piston rod 21, and a brace 65 is connected to the arm 64, there being a second brace 66 connected to the first brace 65, at one end and at the opposite end to an arm 9 that extends outwardly of and is rigidly fixed to the cylinder 19, Figs. 13 and 14. These braces 65 and 66 may be pivotally connected together as at 67. The numeral 68 indicates a movable actuator which includes right angularly arranged portions 69 and 70. The numerals 71 and 72 indicate make and break switches which are controlled by the actuator 68. The actuator 68 is connected to the brace 66, at the end thereof that is connected to the arm 9. The switch 71 includes a spring pressed arm 73 and the arm 73 is mounted for movement into and out of engagement with the stationary contact 74, there being a wire 75 connecting the contact 74 in the electrical circuit. Similarly, the other switch 72 includes a spring arm 76 which is mounted for movement into and out of engagement with the stationary contact 77, and a wire 78 connects the contact 77 of the switch 72 into the circuit. The motor 41 is electrically connected to the switches 71 and 72 by means of wires 79 and 80. The provision of the arm 64 as well as the braces 65 and 66 insures that the piston rod 21 as well as the wheel members 26 will be maintained in their proper alined positions as they move up and down so that these members will not be able to accidentally rotate or shift out of their proper positions. In addition, this construction insures that as the rod 21 moves up and down, the arm 64 will move up and down so as to move the braces 65 and 66 back and forth from the position shown in Figure 10 or to the position shown in Figure 11. When the parts are in the position of Figure 11, the actuator 68 will have its portion 70 engaging the spring 73 of the switch 71 so as to move the spring piece 73 away from the contact 74 so as to open the circuit through the wire 79 to the motor 41. However, with the parts in the position of Figure 11, the spring piece 76 is in engagement with the contact 77 so that the electrical circuit between the wire 78 and through the switch 72 is completed through the wire 80 to the motor 41.

Similarly, with the parts in the position of Figure 10, the portion 69 of the actuator 68 engages the spring piece 76 so as to open the switch 72 and interrupt the circuit through the wire 80 to the motor 41. However, with the parts in the position of Figure 10 the spring piece 73 is permitted to engage the stationary contact 74 so that the circuit from the wire 75 through the switch 71 and through the wire 79 to the motor 41 is completed.

From the foregoing, it is apparent that there has been provided a side parking device for vehicles such as automobiles, and in use the parts are adapted to be arranged and constructed in such a manner that there will be no interference with normal use or driving of the vehicle such as the vehicle 10. Thus, the rear wheels 15 provide forward and reverse movement of the vehicle in the usual manner. When a vehicle is being driven in a normal manner, the wheel members 26 are in the raised position, as for example as shown in Figure 2 or in Figure 10, and at this time the lever 54 is in the raised position. When the vehicle is to be parked in a small space, as for example when it is to be parked between two other vehicles, the mechanism of the present invention can be actuated. When the vehicle is being driven forward or backed up in the usual manner, the lever 54 is in a neutral position as indicated by broken lines in Figure 10 so that wheel members 26 will be maintained immobile in a position such as a raised position. Then, to move the vehicle laterally or in a sideways direction, the lever 54 can be moved from the solid line position of Figure 10 which is in the lowermost setting, to a raised position as shown in Figure 11, and the lever 54 can pivot on the pin 55. As the lever 54 is swung upwardly to the position of Figure 11 from the position of Figure 10, the linkage 56, 57 and 58 will cause corresponding movement of the core 46 in the valve 43. Thus, with the valve 43 arranged as shown in Figure 11, it will be seen that hydraulic fluid will be pumped from the tank 40 through the conduit 49, then through the pump 42, and this hydraulic fluid under pressure will pass through the conduit 50, and then through the passageway 48 and then through the conduit 52 into the top of the cylinder 19 so as to lower the piston 20. It is to be noted that with the lever 54 in the position of Figure 11, the contact 59 engages the terminal 61 so as to complete the electrical circuit to the motor 41 whereby the pump 42 can be driven by the motor. As the rod 21 moves downwardly with the piston 20, the wheel members 26 will similarly be moved downward, and as the wheel members move downwardly and engage the ground or road surface, they elevate the usual rear wheels 15 of the vehicle so that the rear of the vehicle will be raised or elevated the slight distance whereby the vehicle will be supported on the wheel members 26. Next, by manually pressing on one of the buttons such as the button 35 or the button 36, the electrical circuit to the reversing motor 33 will be completed and this will cause the shaft 32 to rotate which in turn will rotate the gear 30 and since the worm 31 meshes with the gear 30, the worm 31 will rotate and cause rotation of the flexible drive 29. Since the drive 29 is connected to the shaft 25 through the worm 28 and gear 27, it will be seen that the motor 33 will provide a means for rotating the wheels 26 which are mounted on the shaft 25. Thus, the vehicle can be moved laterally or in a sideways direction until the desired position of the vehicle is achieved.

It is to be noted that as the rod 21 moves downwardly, the arm 64 as well as the linkage 65, and 66 move from the position shown in Figure 10 to the position shown in Figure 11, and as previously described this arrangement insures that the rod 21 as well as the wheel members 26 will be maintained in their proper alined positions whether up or down. Similarly, this mechanism serves to operate the automatic limit switch so as to automatically interrupt the circuit to the motor 41 when the piston 20 has reached its lower or upper limit of travel. For example as shown in Figure 11, when the rod 21 is at its lowermost position, the actuator 68 has its portion 70 engaging the spring members 73 so as to maintain the spring member 73 away from the contact 74 and this has the effect of interrupting the circuit to the motor 41 so that no further pumping action by the pump 42 will result. Similarly, when the piston 20 is in its raised position as shown in Figure 10, the portion 69 of the actuator 68 engages the spring member 76 to separate the spring member from the contact 77 so as to interrupt the circuit between the wires 78 and 80 which lead to the motor 41. It is to be noted that when one of the switches 71 or 72 is opened, the other switch is automatically closed.

As shown in Figure 12, when the lever 54 is in a neutral or intermediate position, the passageways 48 and 47 of the core 46 are out of registry or alinement with the conduits such as the conduits 51, 52, 50 or 53 so that the piston 20 will be locked in its desired position until the lever 54 is again moved to shift the core 46 to the desired position.

It is to be understood that with the vehicle moved sideways to the desired position, the pressure on the button such as the button 35 can be released so as to stop rotation of the wheels 26. Also, after the vehicle has been parked, the lever 54 can be moved to a position to cause the piston 20 and wheel members 26 to move to a raised position so that the vehicle will be supported on the rear wheels 15 in the usual manner. Furthermore, when it is desired to maneuver the vehicle out of the small parking space, the reverse procedure is followed and since the motor 33 is of the reversing type, the other button such as the button 36 can be depressed so as to cause the wheels 26 to rotate in a reverse direction whereby with these wheels 26 in a lowered position, the vehicle can be conveniently and readily maneuvered or moved out of a small parking space or area.

The parts can be made of any suitable material and in different shapes or sizes.

The present invention is especially suitable for use in parking a vehicle such as an automobile between two parked vehicles at the curb. Curb side parking in congested areas is a very serious problem especially as new automobiles are being built longer each year, and it is believed that the present invention will be a boon to drivers who operate their cars where parallel parking is necessary.

The device is easy to operate and by moving the lever 54 which can be located at a convenient position such as on the dashboard of the vehicle, hydraulic fluid under pressure will move the piston, and at the same time the electric motor 41 will be started so as to operate the pump 42 as previously described. The circuit breaking switches are adjustable. These circuit breaking switches automatically stop the motor 41 at the proper time.

An important aspect of the present invention is the knee action roller guide including the member 64 and the circuit breakers 71 and 72. The knee action assembly when unfolded as shown in Figure 11 serves to guide and hold the two rollers or wheels 26 in a fixed position while swinging the car rear in a radius to the curb. The driver then moves the hand lever 54 to down position, and in so doing it changes the position of the fluid valve 43 to allow hydraulic fluid from the motor pump to raise the piston. The piston is stopped at the top of the cylinder by the knee action circuit breaker 72 so as to stop the pump and motor. The circuit breaker also stops the piston at the full down stroke due to the provision of the switch 71.

The roller wheels 26 are shown mounted on the ends of the axle 25, but these rollers could be mounted in tandem or an offset front and rear position. Both electric motors, as well as the pump and fluid tank are mounted on the body frame to eliminate unnecessary direct weight on the axle housing assembly 12. Another important feature of the present invention is the provision of supplying power to the roller wheels 26 through the flexible shaft 29 which is operated by the reversible motor 33 mounted on the chassis.

Minor changes in shape, size and rearrangement of details coming within the field of invention claimed may be resorted to in actual practice, if desired.

I claim:

In a vehicle, a dashboard, a housing having a rear axle connected thereto, ground engaging wheels connected to said axle, a frame including a pair of spaced parallel beams, a support member connected to said housing, a stationary cylinder connected to said support member, a piston movably mounted in said cylinder, means for moving said piston, a rod depending from said piston, a bracket connected to the lower end of said rod, a casing mounted within said bracket, a shaft extending through said casing and having an axis normal to the axle axis, a pair of spaced parallel wheel members connected to said shaft, worm and gear means operatably connected to said shaft, a flexible drive shaft connected to said worm and gear means, a reversing motor supported by one of said beams and drivingly connected to said flexible shaft for rotating said flexible shaft, manually operable push buttons on the vehicle dash for controlling actuation of said reversing motor, the means for moving said piston comprising a hydraulic fluid reservoir tank, a pump and motor supported by one of said beams, flexible conduits connecting said tank and said pump to said cylinder, a control valve mounted in one of said conduits, a manually operable lever connected to said dash, linkage connecting said lever to said valve, and means for automatically interrupting the circuit to the pump motor when the piston reaches its upper and lower limits of travel, said last mentioned means comprising an arm fastened to the rod for said piston, a pair of braces pivotally connected to each other and one of said braces further pivotally connected to said arm, a second arm rigidly fixed to said cylinder and pivotally connected to the other of said braces, an L-shaped actuator pivotally mounted on said last-mentioned pivotal connection and fixedly secured to the other of said pair of braces, a pair of make and break switches controlled by said actuator, and electrical connections between said switches and said motor.

References Cited in the file of this patent
UNITED STATES PATENTS

| | | |
|---|---|---|
| 1,840,258 | Schafer | Jan. 5, 1932 |
| 2,090,768 | Thomas | Aug. 24, 1937 |
| 2,593,024 | Hall et al. | Apr. 15, 1952 |
| 2,685,934 | Coloma | Aug. 10, 1954 |
| 2,746,554 | Matthews | May 22, 1956 |